United States Patent Office 3,839,391
Patented Oct. 1, 1974

3,839,391
METHOD OF ISOTHERMAL SULFONATION
Rinnosuke Susuki and Syuhei Tanimori, Tokyo, and Sadao Toyoda and Toshiaki Ogoshi, Funabashi, Japan, assignors to Lion Fat & Oil Co., Ltd., Tokyo, Japan
No Drawing. Filed July 28, 1971, Ser. No. 167,046
Claims priority, application Japan, July 31, 1970, 45/67,121
Int. Cl. C07c *139/00*
U.S. Cl. 260—457   5 Claims

ABSTRACT OF THE DISCLOSURE

A method of sulfonation by the use of an apparatus for film-sulfonation, wherein the sulfonation reaction is performed through gas-liquid contact effected by making a cooling gas such as air or inert gas pass between a filmy stream of a liquid reactant and $SO_3$-inert gas in parallel therewith in an amount of about 2–12 times as much as said $SO_3$-inert gas, which facilitates the control of temperature of the filmy reaction surface.

BACKGROUND OF THE INVENTION

(a) Field of the invention

The present invention relates to a method of isothermal sulfonation of organic compounds, which prevents the occurrence of sharp rises in temperature incident to the initial stage of the reaction for film-sulfonation of organic compounds. The term "sulfonation" herein includes both sulfonation and sulfation.

(b) Description of the prior art

Generally speaking, the reaction speed of sulfonation of organic compounds is so high that the greater part of said sulfonation is effected at the initial stage of the reaction. For example, according to the Japanese Patent Toku-Ko-Sho 42-252, 90% of the entire amount of organic compound undergoes reaction in the first rotor section, and according to the Japanese Patent Toku-Ko-Sho 43/13,043, 95% of the entire amount of organic compound undergoes reaction while it flows down a distance of 1 foot from the start. Besides, as the sulfonation reaction in this case is a strong exothermic reaction, the temperature is apt to rise very rapidly at the initial stage of reaction, and any partial failure to remove the heat of reaction gives rise to undersirable effects such as side reactions, coloring of the product, etc. According to the conventional method of film-sulfonation through gas-liquid contact, it has been impossible to avoid said sharp rise in temperature even by cooling of the reaction surface.

The procedures of sulfonation vary with the properties and structures of hydrocarbon, etc. to be subjected to sulfonation as well as the kinds of products to be manufactured therefrom, and sulfonation by the use of sulfur trioxide is one of the typical procedures. Sulfur trioxide can theoretically complete the addition reaction rapidly and quantitatively, so that it is a very effective sulfonating agent and has been generally utilized for this purpose. But, sulfur trioxide, when employed as it is, will generate great heat resulting in various side reactions, and, therefore, such measure as diluting it with air or an inert gas prior to application thereof has been popular. In this case, however, coloring of the reaction product is unavoidable and, accordingly, the finishing process resorting to bleaching becomes indispensable.

SUMMARY OF THE INVENTION

The first object of the present invention is to avoid the sharp rises in temperature during the initial stage of a sulfonation reaction.

The second object of the present invention is to provide a method of obtaining a superior product having a minimum of coloring and by-products, by carrying out an isothermal reaction.

The third object of the present invention is to reduce the amount of mist contained in the waste gas.

The fourth object of the present invention is to provide a method which renders it possible to effect an isothermal sulfonation reaction by the use of a film-reaction apparatus of any type.

The fifth object of the present invention is to provide a method of obtaining a sulfonated product efficiently without resorting to bleaching as an after-process.

The inventors of the present invention have probed the cause of formation of the colored substances, by-products, etc. in the sulfonation reaction by means of sulfur trioxide effected through gas-liquid contact and found that said formation of colored substances, by-products, etc. can be remarkably reduced and at the same time the yield (i.e. reaction rate) of the main reaction can be augmented by making a cooling gas, such as air or inert gas, pass between a filmy stream of liquid reactant and $SO_3$-inert gas stream in parallel therewith. The present invention has been accomplished on the basis of this finding.

The present invention relates to a method of effecting a sulfonation reaction by utilizing air or an inert gas as the cooling gas and making it pass between a filmy stream of liquid reactant and an $SO_3$-inert gas stream in parallel therewith. In this method said cooling gas is introduced in an amount of about 2–12 times as much as the $SO_3$-inert gas. To be more precise, in the present method the stream of $SO_3$-inert gas mixture has an $SO_3$ concentration of about 3–16 vol. percent and a linear velocity of about 20–100 m./sec. preferably about 20–80 m./sec., and the temperature of the $SO_3$-inert gas mixture is about 20–50° C. As to said cooling gas, the temperature is about 10 to 40° C., the flux is about 2–12 times, preferably about 2–7 times, as much as the $SO_3$-inert gas mixture and the linear velocity is substantially the same as that of the $SO_3$-inert gas mixture.

According to the sulfonation reaction in the present invention effected under the foregoing conditions, by virtue of direct introduction of said cooling gas into the reaction zone and particularly between the filmy stream of liquid reactant and the stream of $SO_3$-inert gas mixture, the sulfonation reaction is slowed down during the initial stage and the increase in viscosity of the reactant becomes less, resulting in augmentation of the over all heat-transfer coefficient of the cooling surface and enhancement of the cooling efficiency thereof, whereby the temperautre control of the filmy reaction surface on the occasion of intense sulfonation reaction during the initial stage of reaction is facilitated. Besides, the diffusion of $SO_3$ gas into the liquid reactant becomes gentle and the reaction is effected mildly, so that there is brought about no sharp rise in temperature and the reaction is effected almost isothermally throughout the process.

Further, the present method is applicable to any type of film-sulfonation apparatuses such as double-cylinder type, flat plate type, etc. as well as one combining a plurality thereof. For the purpose of accomplishing the isothermal reaction according to the present invention, it is required that the flux rate of $SO_3$-inert gas to the cooling gas is in the range of about 1:2 to about 1:12—preferably about 1:2 to about 1:7, and the linear velocity of both gases is substantially the same and is in the range of about 20–100 m./sec.—preferably about 20–80 m./sec.

The sulfonatable material treated by the present invention undergoes the sulfonation reaction so appropriately that generation of undesirable side reactions or colored substances is checked and an excellent product can be obtained. Not only that, because the product has little coloring, it is possible to dispense with bleaching as an afterprocess. Direct introduction of the cooling gas into the reaction zone serves to reduce the amount of diluted gas and, accordingly, reduction of the capacity of the apparatus for feeding $SO_3$ gas is quite feasible. Further, inasmuch as the reaction taking place on the surface of the filmy liquid reactant is properly controlled, generation of mist decreases so remarkably that the reaction is effected efficiently, resulting in not only an increase of yield and economy of sulfonating agent but also a decrease in the amount of mist contained in the waste gas which is much contributive to the prevention of air pollution. In the light of this fact, the industrial merit of the present invention is substantial.

The material to be subjected to sulfonation according to the present invention includes alkylaryl hydrocarbon, olefin hydrocarbon, aliphatic alcohol, alkyl phenol as well as ethoxylate thereof, and other sulfonatable organic compounds.

In this connection, as an example of the method of sulfonation of organic compounds by employing $SO_3$-inert gas mixture and the inert gas separately and using a film-sulfonation apparatus, there is known the disclosure in the specification of the U.S. Pat. 2,923,728. This method, however, uses the air as the driving gas for the purpose of forming a film of organic compounds by employing a tubular reaction apparatus, and it features that the flow rate of $SO_3$-inert gas to the driving gas is about 1:1 to 1:2 preferably 1:1, and as to the linear velocity of gas, it is about 150–400 ft./sec. (45.7–121.9 m./sec.) for $SO_3$-inert gas, about 30–50 ft./sec. (9–15 m./sec.) for the driving gas and 60–110 ft./sec. (18–33.5 m./sec.) for the mixture of these two gases. However, this method is incapable of dispelling the occurrence of sharp rises in temperature on the occasion of sulfonation.

DESCRIPTION OF THE PREFERRED EMBODIMENTS

Hereunder given are examples embodying the present invention.

Example 1

$\alpha$-olefin ($C_{15-18}$) obtained through wax decomposition and straight-chain alkylbenzene (molecular weight: 243) were selected as the liquid reactants. These liquid reactants were made into a filmy stream respectively by the use of a film-sulfonation apparatus, and the temperature of said filmy stream at various places in the reactor was measured during sulfonation reaction effected by introducing the cooling air. For purposes of comparison, the tests were repeated without using cooling air. The result was as shown in the following Table 1(a) and Table 1(b), respectively. It is evident from these results that sulfonation reaction effected by introducing an appropriate amount of cooling air into the reaction zone according to the method of the present invention is accomplished at a relatively low temperature and is isothermal. In this connection, in both cases of the comparative example and the present method, the total amount of said cooling air was 3 Nm.$^3$/min., and the measurement of temperature was conducted by using a thermocouple of 0.2 mm. in the outside diameter of sheath.

TABLE 1(a)

Sulfonation of $\alpha$-olefin ($C_{15-18}$) obtained through wax decomposition

| | | Distance from $SO_3$ gas-feeding nozzle (cm.) | Feed of liquid reactant | |
|---|---|---|---|---|
| | Amount of cooling air | | 140 kg./m. hr. (° C.) | 245 kg./m. hr. (° C.) |
| Comparative example | 0 (air for dilution of $SO_3$: 3 Nm.$^3$/min.). | 20 | 101 | 128 |
| | | 35 | 71 | 84 |
| | | 200 | 44 | 56 |
| Method according to the present invention. | 2.2 (Nm.$^3$/min.) (air for dilution of $SO_3$: 0.8 Nm.$^3$/min.). | 20 | 44 | 58 |
| | | 35 | 45 | 58 |
| | | 200 | 45 | 56 |

TABLE 1(b)

Sulfonation of straight-chain alkylbenzene

| | | Distance from $SO_3$ gas-feeding nozzle (cm.) | Feed of liquid reactant | |
|---|---|---|---|---|
| | Amount of cooling air | | 140 kg./m. hr. (° C.) | 245 kg./m. hr. (° C.) |
| Comparative example | 0 (air for dilution of $SO_3$: 3 Nm.$^3$/min.). | 20 | 84 | 100 |
| | | 35 | 72 | 84 |
| | | 200 | 45 | 52 |
| Method according to the present invention. | 2.2 (Nm.$^3$/min.) (air for dilution of $SO_3$: 0.8 Nm.$^3$/min.). | 20 | 43 | 55 |
| | | 35 | 45 | 52 |
| | | 200 | 44 | 52 |

Example 2

Sulfonation reaction of $\alpha$-olefin ($C_{15-18}$) obtained through wax cracking was effected under the following conditions of reaction:

Length of reactor: 2 m., distance between the inner and outer reaction surfaces: 5.5 mm., feed of material: 40 kg./hr., molar ratio of $SO_3$ to $\alpha$-olefin: 1.15, total amount of air: 3 Nm$^3$/min., linear velocity: 60 m./sec., temperature of cooling gas: 20° C., temperature of cooling water: 25° C.

The result was as shown in the following Table 2. In case of the sulfonation reaction effected by introducing an appropriate amount of cooling air into the reaction zone according to the method of the present invention, there is no occurrence of sharp rises in temperature following the start of reaction, the coloring degree of product is low, and the generation of by-product (disulfonate) decreases.

TABLE 2

| | Comparative example | Example according to the present invention |
|---|---|---|
| | No cooling air | Cooling air, 2.2 Nm.$^3$/min. |
| Temperature of film 20 cm. away from $SO_3$ feeding nozzle, ° C. | 101 | 44 |
| Unreacted oil content (extracted amount of petroleum ether: against active salt), percent | 3.50 | 3.48 |
| Coloring (5% concentration) (degree of light-absorption, 10 mm. cell, 420 m$\mu$) | 0.650 | 0.500 |
| Disulfonate (against active salt), percent | 9.6 | 8.1 |

Example 3

Sulfonation reaction of α-olefin ($C_{16}$) obtained through ethylene polymerization process was effected under the same conditions of reaction as in Example 2. The result was as shown in the following Table 3. In case of the sulfonation reaction effected by introducing an appropriate amount of cooling air into the reaction zone according to the present invention, there is no occurrence of sharp rises in temperature, the coloring degree of product is very low, and the generation of by-product (disulfonate) also decreases.

TABLE 3

|  | Comparative example | Example according to the present invention | | |
|---|---|---|---|---|
|  | No cooling air | Cooling air: 2.2 Nm.³/min. | Cooling air: 2.4 Nm.³/min. | Cooling air: 2.6 Nm.³/min. |
| Temperature of film 20 cm. away from $SO_3$ feeding nozzle, °C | 96 | 47 | 46 | 47 |
| Unreacted oil content (extracted amount of petroleum ether: against active salt), percent | 2.91 | 2.64 | 2.58 | 2.60 |
| Coloring (5% concentration) (degree of light-absorption, 10 mm. cell, 420 mµ) | 0.125 | 0.075 | 0.080 | 0.083 |
| Disulfonate (against active salt), percent | 8.5 | 7.0 | 7.1 | 7.1 |

Example 4

Sulfonation reaction of straight-chain alkylbenzene (molecular weight: 243) was effected under the same conditions of reaction as in Example 2 except for making the molar ratio of $SO_3$ to straight-chain alkylbenzene to be 1.05. The temperature of cooling gas is 30°C. The result was as shown in the following Table 4. In case of the sulfonation reaction effected by introducing an appropriate amount of cooling air into the reaction zone according to the present invention, there is no occurrence of sharp rises in temperature and the coloring degree of product is very low. This degree of coloring can dispense with the bleaching work as an after-process.

TABLE 4

|  | Comparative example | Example according to the present invention |
|---|---|---|
|  | No cooling air | Cooling air: 2.2 Nm.³/min. |
| Temperature of film 20 cm. away from $SO_3$ feeding nozzle, °C | 84 | 43 |
| Unreacted oil content (extracted amount of petroleum ether: against active salt), percent | 1.45 | 1.13 |
| Coloring (10% concentration) (degree of light-absorption, 10 mm. cell, 420 mµ) | 0.038 | 0.015 |
| Alcohol-insoluble content (against active salt), percent | 1.56 | 0.95 |

Example 5

Sulfation reaction of a condensation product of synthetic alcohol ($C_{12}$) with 3 mol of ethylene oxide was effected under the same conditions of reaction as in Example 2 except for making the molar ratio of $SO_3$ to the foregoing material to be 1.03. The temperature of cooling gas is 25°C. The result was as shown in the following Table 5. In case of the sulfation reaction effected by introducing an appropriate amount of cooling air into the reaction zone according to the present invention, there is no occurrence of sharp rises in temperature and the coloring degree of product is very low. This degree of coloring can dispense with the bleaching work as an after-process.

TABLE 5

|  | Comparative example | Example according to the present invention |
|---|---|---|
|  | No cooling air | Cooling air: 2.2 Nm.³/min. |
| Temperature of film 20 cm. away from $SO_3$ feeding nozzle, °C | 80 | 44 |
| Unreacted oil content (ion-exchange resin: against active salt), percent | 2.92 | 2.41 |
| Coloring (5% concentration) (degree of light-absorption, 10 mm. cell, 420 mµ) | 0.026 | 0.014 |

Example 6

In sulfonation reaction of α-olefin ($C_{14}$) obtained through ethylene polymerization, which was effected under the same conditions of reaction as in Example 2 except for making the molar ratio of $SO_3$ to α-olefin to be 0.98 and the temperature of cooling gas to be 25°C., analysis of the waste gas arising from said reaction was conducted. The result was as shown in the following Table 6. This showing proves that the amount of mist arising from the method of the present invention is very small and, therefore, this method is very effective also in preventing air pollution.

TABLE 6

|  | Comparative example | Example according the present invention |
|---|---|---|
|  | No cooling air | Cooling air: 2.2 Nm.³/min. |
| $SO_2$ (p.p.m.) | 84 | 73 |
| $SO_3$ (p.p.m.) | 27 | 21 |
| Amount of mist (organic matter) (mg./l.) | 5.5 | 1.8 |

Example 7

Sulfation reaction of synthetic alcohol ($C_{12-13}$) was effected under the same conditions of reaction as in Example 2 except for making the molar ratio of $SO_3$ to said material alcohol to be 1.03 and applying various amounts of cooling gas as shown in the following Table 7. The result was as shown in the same table.

TABLE 7

|  | Comparative example | Example according to the present invention | | |
|---|---|---|---|---|
|  | No cooling air | Cooling air: 2.2 Nm.³/min. | Cooling air: 2.4 Nm.³/min. | Cooling air: 2.6 Nm.³/min. |
| Temperature of film 20 cm. away from $SO_3$ feeding nozzle, °C | 87 | 44 | 43 | 44 |
| Unreacted oil content (extracted amount of petroleum ether: against active salt), percent | 2.56 | 2.01 | 2.33 | 2.38 |
| Coloring (5% concentration) (degree of light-absorption, 10 mm. cell, 420 mµ) | 0.025 | 0.012 | 0.010 | 0.010 |

In this specification, the term Nm.³ means volume, in cubic meters, under standard conditions.

What is claimed is:

1. A process for sulfonating liquid sulfonatable organic material selected from the group consisting of alkylaryl hydrocarbons, olefin hydrocarbons, aliphatic alcohols and ethoxylates thereof and alkyl phenols and ethoxylates thereof, in which a continuous thin film of said liquid sulfonatable organic material is flowed along an externally cooled reaction surface in a reaction zone and is contacted in said reaction zone with a separately supplied first stream of a mixture of gaseous sulfur trioxide and inert gas flowing in parallel with said film to effect sulfonation of said material, wherein the improvement comprises: continuously flowing a separately supplied second gaseous stream consisting essentially of air or inert gas free of $SO_3$ into the feed end of said reaction zone in parallel with, in contact with and between said film and said first stream so as to form a parallel flowing layer of said second gaseous stream between said film and said first stream in said reaction zone, said second stream being at a temperature of from 10 to 40° C. and having a flow rate of from about 2 to 12 times the flow rate of said first stream, the linear velocity of said second stream being substantially the same as that of said first stream and in the range of from about 20 to 100 m./sec., whereby to retard the initial stage of the sulfonation reaction and to effect the reaction under substantially isothermal conditions throughout the reaction zone.

2. A process as defined in Claim 1, wherein said $SO_3$-inert gas stream has an $SO_3$ concentration of about 3-16 vol. percent.

3. A process as defined in Claim 1, wherein the molar ratio of said organic material to $SO_3$ is in the range of 1:0.9–1.2.

4. A process as defined in Claim 1, wherein the feed rate of said organic materal is in the range of 100 kg./m. hr.–400 kg./m. hr.

5. A process as defined in Claim 1, wherein the temperature of said film at a point 20–35 cm. below the location for feeding $SO_3$-inert gas into the reaction zone is about 40–70° C.

References Cited
UNITED STATES PATENTS

| | | | |
|---|---|---|---|
| 2,923,728 | 2/1960 | Falk et al. | 260—458 X |
| 3,270,038 | 8/1966 | Marshall et al. | 260—458 X |
| 3,328,460 | 6/1967 | Vander Mey | 260—458 X |
| 3,350,428 | 10/1967 | Brooks et al. | 260—458 X |
| 3,427,342 | 2/1969 | Brooks et al. | 260—458 |

FOREIGN PATENTS

| | | | |
|---|---|---|---|
| 1,200,292 | 9/1965 | Germany | 260—458 |

OTHER REFERENCES

K. Gerhart et al.: J. Am. Oil. Chem. Soc. *31*, 200–203 (1954).

LEON ZITVER, Primary Examiner

N. MORGENSTERN, Assistant Examiner

U.S. Cl. X.R.

260—458, 459, 505 S, 513 R, 512 R